US006674083B2

(12) United States Patent
Tanaka et al.

(10) Patent No.: US 6,674,083 B2
(45) Date of Patent: Jan. 6, 2004

(54) POSITRON EMISSION TOMOGRAPHY APPARATUS

(75) Inventors: Eiichi Tanaka, Hamamatsu (JP); Takaji Yamashita, Hamamatsu (JP); Hiroyuki Okada, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 98 days.

(21) Appl. No.: 09/873,352

(22) Filed: Jun. 5, 2001

(65) Prior Publication Data

US 2002/0179843 A1 Dec. 5, 2002

(51) Int. Cl.[7] ............................................. G01T 1/164
(52) U.S. Cl. ............................................. 250/363.03
(58) Field of Search ..................................... 250/363.03

(56) References Cited

U.S. PATENT DOCUMENTS 5,291,021 A * 3/1994 Tanaka et al. ......... 250/363.03
6,175,116 B1 * 1/2001 Gagnon et al. ........ 250/363.03
6,373,059 B1 * 4/2002 Stearns et al. ......... 250/363.03

FOREIGN PATENT DOCUMENTS

JP 04168392 A * 6/1992 ........... G01T/1/161

* cited by examiner

*Primary Examiner*—Constantine Hannaher
(74) *Attorney, Agent, or Firm*—Morgan, Lewis & Bockius LLP

(57) ABSTRACT

A PET apparatus includes a detecting unit; slice septa for transmitting therethrough flying photons nearly perpendicular to the center axis; a slice septa position determining section for determining whether or not the slice septa exist in the measurement space side of at least one of the pair of photon detectors; a two-dimensional projection image storage section for storing coincidence-counting information of the photon pair obtained by the pair of photon detectors; a three-dimensional projection data storage section for storing coincidence counting information obtained by the pair of photon detectors; and an image reconstructing section for reconstruction an image indicative of a spatial distribution of a frequency at which photon pairs are emitted in the measurement space.

5 Claims, 12 Drawing Sheets

PRIOR ART

PRIOR ART

PRIOR ART

POSITRON EMISSION TOMOGRAPHY APPARATUS

BACKGROUND OF THE INVENTION

1. Field of the Invention

The present invention relates to a PET apparatus which can visualize behaviors of trace substances labeled with positron emitting isotopes (RI sources).

2. Related Background Art

PET (positron emission tomography) apparatus are apparatus which can visualize behaviors of trace substances within a living body (subject) having an RI source administered therein by detecting a pair of photons occurring as an electron/positron pair annihilation and flying in directions opposite from each other. A PET apparatus is equipped with a detecting unit having a number of small-size photon detectors arranged about a measurement space in which the subject is placed, detects and stores photon pairs occurring as electron/positron pairs annihilation by coincidence counting, and reconstructs an image indicative of a spatial distributions with respect to the frequency of generation of photon pairs in the measurement space, on the basis of the stored number of coincidence-counting information items, or projection data. The PET apparatus play an important role in the field of nuclear medicine and the like, whereby biological functions and higher-order functions of brains can be studied by using it. Such PET apparatus can be roughly classified into two-dimensional PET apparatus, three-dimensional PET apparatus, and slice-septa-retractable type three-dimensional PET apparatus.

FIG. 1 is a view for explaining the configuration of a detecting unit of a two-dimensional PET apparatus. This drawing shows a cross section obtained when the detecting unit is cut along a plane including the center axis. The detecting unit 10 of the two-dimensional PET apparatus has detector rings $R_1$ to $R_7$ stacked between shields 11 and 12. Each of the detector rings $R_1$ to $R_7$ has a plurality of photon detectors arranged like a ring on a plane perpendicular to the center axis. Each photon detector is a scintillation detector in which a scintillator such as BGO ($Bi_4Ge_3O_{12}$), for example, and a photomultiplier tube are combined together; and detects photons reaching there after flying from the measurement space including the center axis. Disposed inside the detector 10 are slice septa 20. The slice septa 20 comprise six ring-like shield plates $S_1$ to $S_6$ disposed at respective positions between neighboring detector rings. Due to the collimating action of the slice septa 20, thus configured detecting unit 10 of the two-dimensional PET apparatus can detect only photon pairs flying from directions forming an angle of about 90 degrees with respect to the center axis. Namely, the coincidence-counting information, i.e., two-dimensional projection data, obtained and stored by the detecting unit 10 of the two-dimensional PET apparatus is limited to that obtained by a pair of photon detectors included in the same detector rings or detector rings adjacent each other (or very close to each other). Therefore, the two-dimensional PET apparatus can efficiently eliminate scattered photons in which photon pairs are generated at positions outside the measurement space, and can easily carry out attenuation correction and detector sensitivity correction with respect to the two-dimensional projection data.

FIG. 2 is a view for explaining the configuration of a detecting unit of a three-dimensional PET apparatus. This drawing also shows across section obtained when the detecting unit is cut along a plane including the center axis. The detecting unit 10 in the three-dimensional PET apparatus is configured similarly to that in the two-dimensional PET apparatus. However, the three-dimensional PET apparatus is not equipped with slice septa. Thus configured detecting unit 10 of the three-dimensional PET apparatus can detect photon pairs coming from all the directions. Namely, the coincidence-counting information, i.e., three-dimensional projection data, obtained and stored by the detecting unit 10 of the three-dimensional PET apparatus can be that obtained by a pair of photon detectors included in any detector rings. Therefore, the three-dimensional PET apparatus can detect photon pairs at a sensitivity higher than that in the two-dimensional PET apparatus by about 5 to 10 times.

FIGS. 3A and 3B are views for explaining the configuration of a detecting unit of a slice-septa-retractable type three-dimensional PET apparatus. These drawings also show across section obtained when the detecting unit is cut along a plane including the center axis. The detecting unit 10 in the slice-septa-retractable type three-dimensional PET apparatus is configured similarly to that in the two-dimensional PET apparatus. However, the slice septa 20 in the slice-septa-retractable type three-dimensional PET apparatus can be retracted into a shelter space provided on the side of a shield 12. Namely, the slice-septa-retractable type three-dimensional PET apparatus is equivalent to the two-dimensional PET apparatus when the slice septa 20 are positioned inside the detector rings $R_1$ to $R_5$ (FIG. 3A), and is equivalent to the three-dimensional PET apparatus when the slice septa 20 are in the shelter space (FIG. 3B). Therefore, the slice-septa-retractable type three-dimensional PET apparatus is used as one of the two-dimensional PET apparatus and three-dimensional PET apparatus depending on the aimed purpose.

In the conventional PET apparatus mentioned above, however, the two-dimensional PET apparatus is hard to detect photon pairs with high sensitivity since it detects only the photon pairs coming from directions at an angle of about 90 degrees with respect to the center axis. On the other hand, the three-dimensional PET apparatus is hard to efficiently eliminate scattered photons in which photons generated in the space outside the measurement space are scattered, whereas its scatter correction, attenuation correction, and detector sensitivity correction are difficult or complicated, whereby favorable images are hard to reconstruct.

Since the slice-septa-retractable three-dimensional PET apparatus acquires two-dimensional projection data and three-dimensional projection data upon separate measurement operations, it is hard to overcome the respective problems inherent in the two-dimensional PET apparatus and three-dimensional PET apparatus mentioned above at the same time. The apparatus configuration may become complicated and expensive.

SUMMARY OF THE INVENTION

In order to overcome the problems mentioned above, it is an object of the present invention to provide a PET apparatus which can simultaneously acquire two-dimensional projection data and three-dimensional projection data, thereby enabling photon pair coincidence counting with high-sensitivity, effective scattering correction, and the like.

The PET apparatus in accordance with the present invention comprises (1) a detecting unit including a plurality of sets of detector rings, each detector ring comprising a plurality of photon detectors disposed on a plane perpendicular to a center axis, each photon detector detecting a photon coming from a measurement space including the center axis, the plurality of sets of detector rings being stacked in a direction parallel to the center axis; (2) slice septa disposed rotatable about the center axis on the measurement space side of a part of the plurality of photon detectors constituting each of the plurality of detector rings, the slice septa transmitting therethrough only a flying photon substantially perpendicular to the center axis; (3) slice septa position determining means for determining, when a pair of photon detectors in the photon detectors included in the detecting unit detect a photon pair, whether or not the slice septa exist on the measurement space side of at least one of the pair of photon detectors; (4) two-dimensional projection image storage means for storing, when it is determined by the slice septa position determining means that the slice septa exist on the measurement space side of at least one of the pair of photon detectors, coincidence-counting information of the photon pair obtained by the pair of photon detectors; (5) three-dimensional projection data storage means for storing, when it is determined by the slice septa position determining means that the slice septa do not exist on the measurement space side of any of the pair of photon detectors, coincidence counting information obtained by the pair of photon detectors; and (6) image reconstructing means for reconstructing, according to three-dimensional projection data generated by the two-dimensional projection data storage means from coincidence-counting information stored thereby and three-dimensional projection data generated by the three-dimensional projection data storage means from coincidence-counting information stored thereby, an image indicative of a spatial distribution of a frequency at which photon pairs occur in the measurement space.

In the PET apparatus, when a photon pair coming from the measurement space is detected by a pair of photon detectors in the detecting unit, it is determined by the slice septa position determining means whether or not the slice septa exist on the measurement space side of at least one of a pair of the photon detectors. This determination is carried out according to the rotational position of the slice septa detected by angular encodor, for example. If it is determined by the slice septa position determining means that the slice septa exist on the measurement space side of at least one of a pair of photon detectors, then the coincidence-counting information of photon pair obtained by the pair of photon detectors is stored by the two-dimensional projection data storage means. If it is determined by the slice septa position determining means that no slice septa exist on the measurement space side of any of them, then the coincidence-counting information of photon pairs obtained by the pair of photon detectors is stored into the three-dimensional projection data storage means. Then, according to the three-dimensional projection data generated by the two-dimensional projection data storage means from the coincidence-counting information stored thereby and three-dimensional projection data generated by the three-dimensional projection data storage means from the coincidence-counting information stored thereby, the image reconstructing means reconstructs an image indicative of a spatial distribution of a frequency at which photon pairs are generated in the measurement space. Thus, the two-dimensional projection data and three-dimensional projection data are simultaneously obtained in one measurement procedure. Therefore, when images are reconstructed by simultaneously acquiring the two-dimensional projection data and three-dimensional projection data as such, photon pairs can be detected with high sensitivity, and scatter correction and the like can be carried out.

The image reconstructing means may reconstruct the images using components having lower spatial frequencies in the two-dimensional projection data and components having higher spatial frequencies in the three-dimensional projection data. In this case, the three-dimensional projection data can favorably be obtained by detecting photon pairs with high sensitivity, and scatter events can effectively be corrected in a favorable manner. Also, scattering can be corrected in the projection data having large angles of inclination.

The PET apparatus may further comprise correction means for correcting the image reconstructed by the image reconstructing means according to the two-dimensional projection data stored in the two-dimensional projection data storage means by providing a rod-shaped calibration source parallel to the center axis at the measurement space side of the slice septa. In this case, detector sensitivity correction and attenuation correction are carried out favorably, whereby a favorable reconstructed image is obtained.

DETAILED DESCRIPTION OF THE PREFERRED EMBODIMENTS

In the following, embodiments of the present invention will be explained in detail with reference to the accompanying drawings. In the explanation of the drawings, constituents identical to each other will be referred to with numerals identical to each other without repeating their overlapping descriptions.

Figure 1:
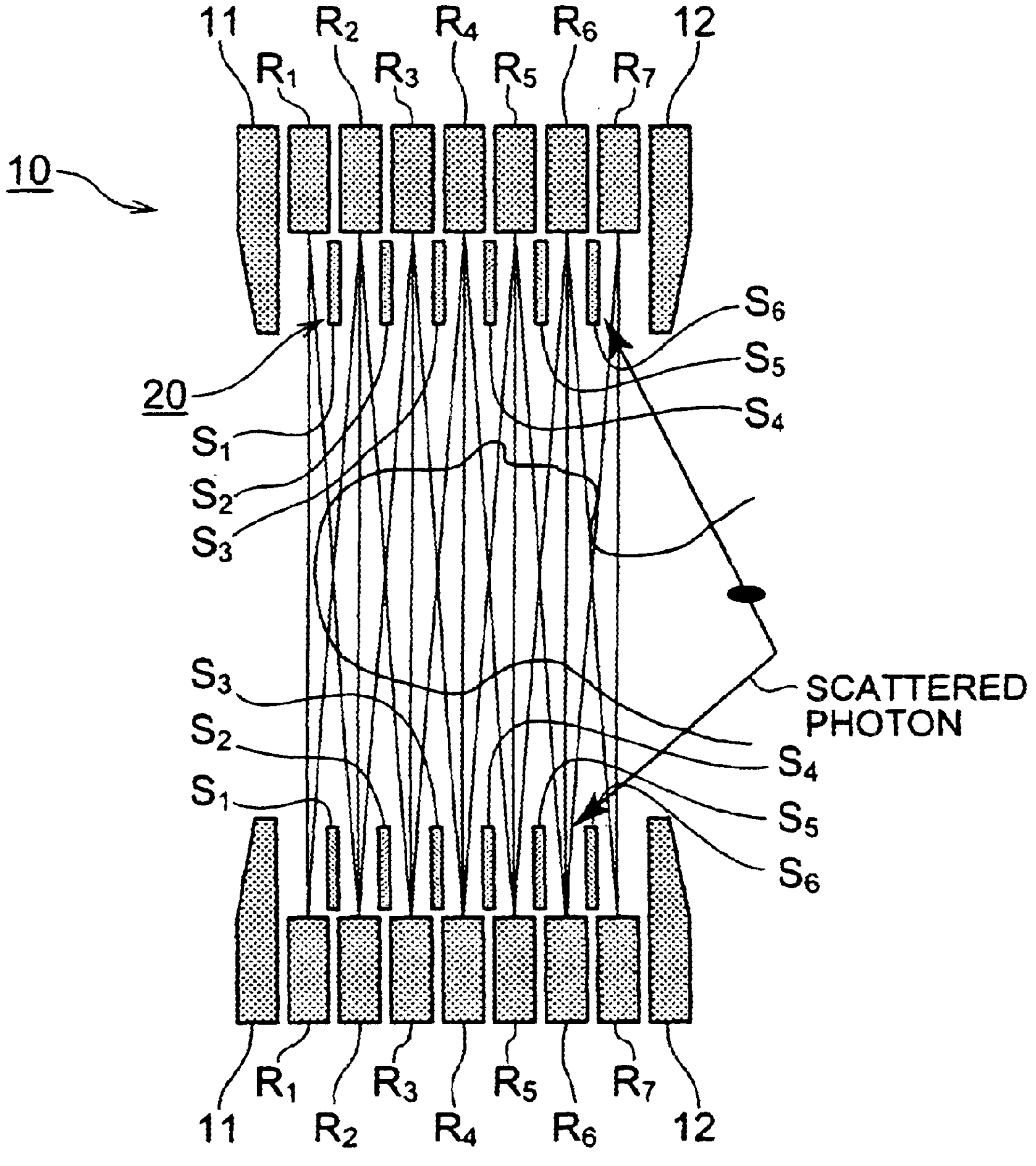
FIG. 1 is a view for explaining the configuration of a detecting unit of a two-dimensional PET apparatus.
Figure 2:
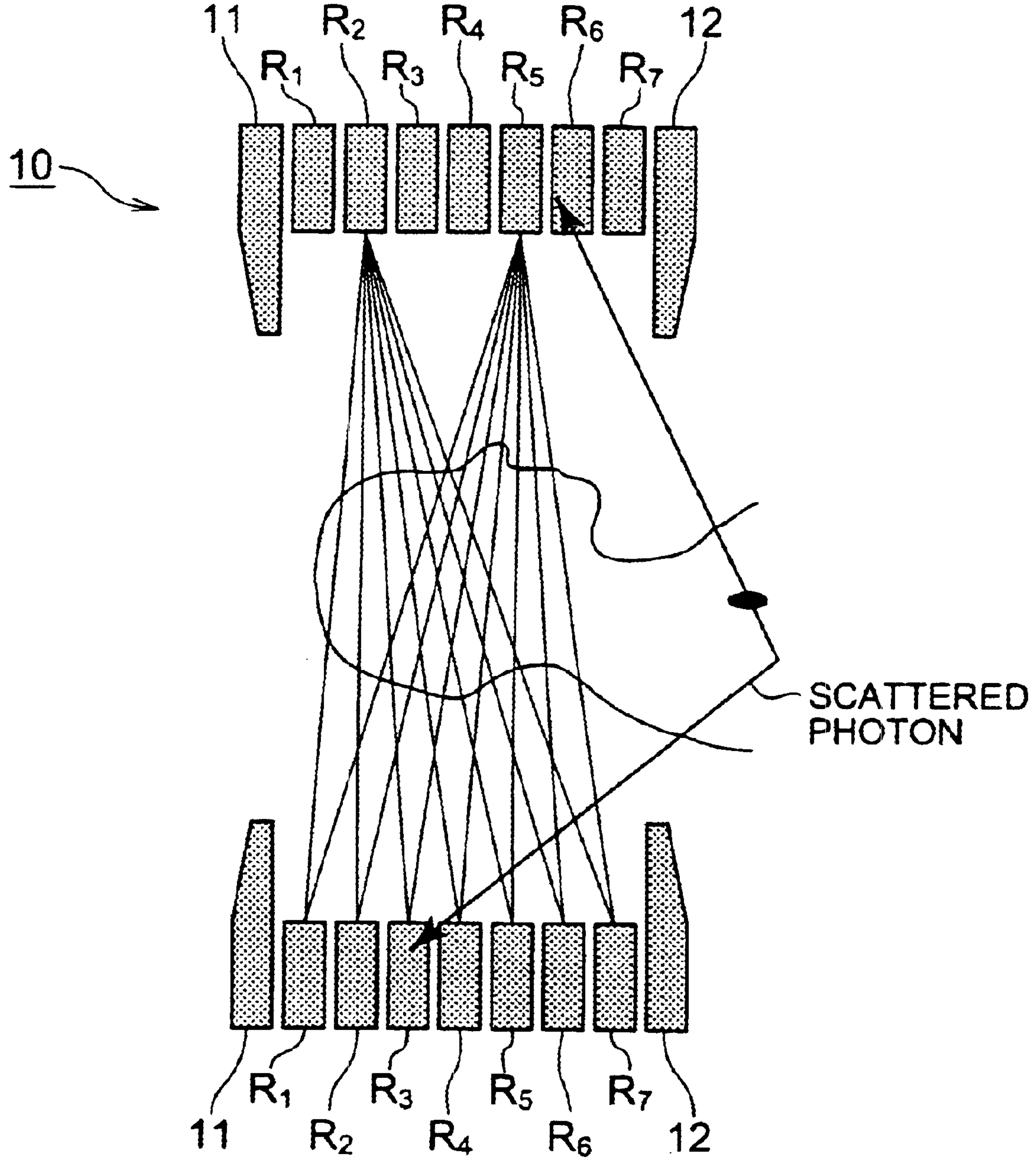
FIG. 2 is a view for explaining the configuration of a detecting unit of a three-dimensional PET apparatus.
Figure 3B:
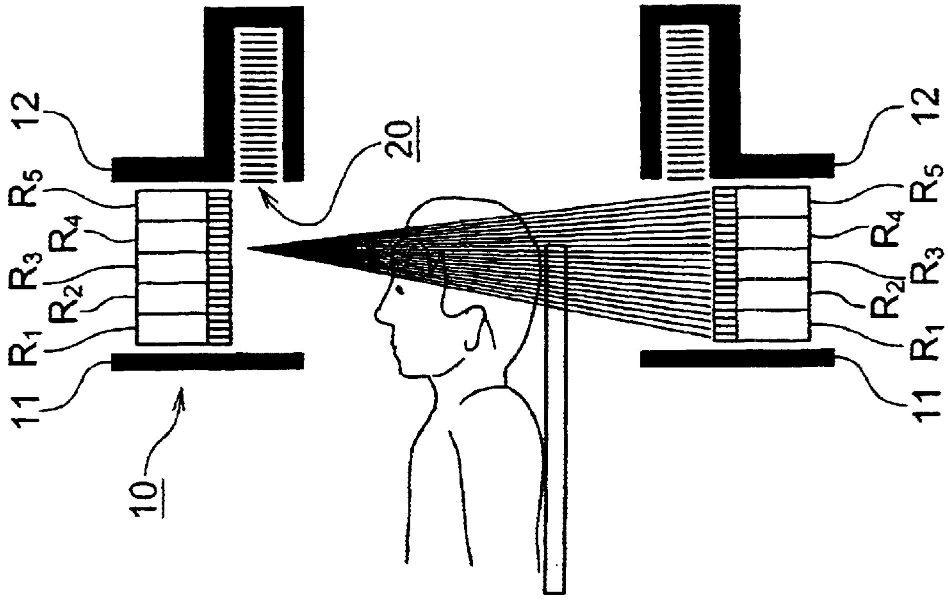
Fig.3B PRIOR ART
FIGS. 3A and 3B are views for explaining the configuration of a detecting unit of a slice-septa-retractable type three-dimensional PET apparatus.
Figure 3A:
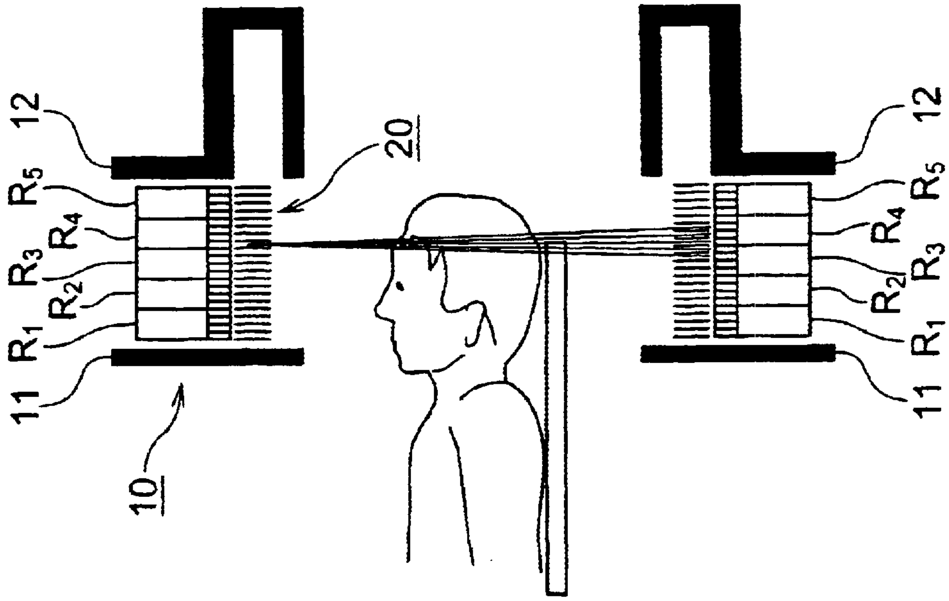
Figure 4A:
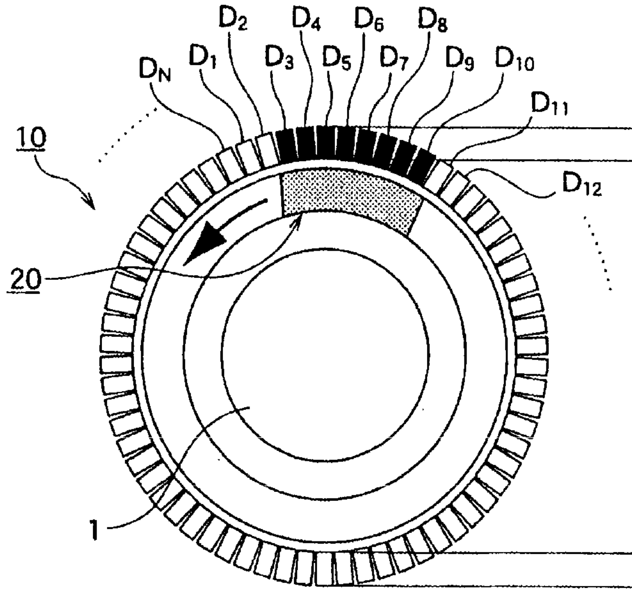
FIGS. 4A and 4B are views for explaining the configuration of detecting unit and slice septa of the PET apparatus in accordance with an embodiment of the present invention.
Figure 4B:
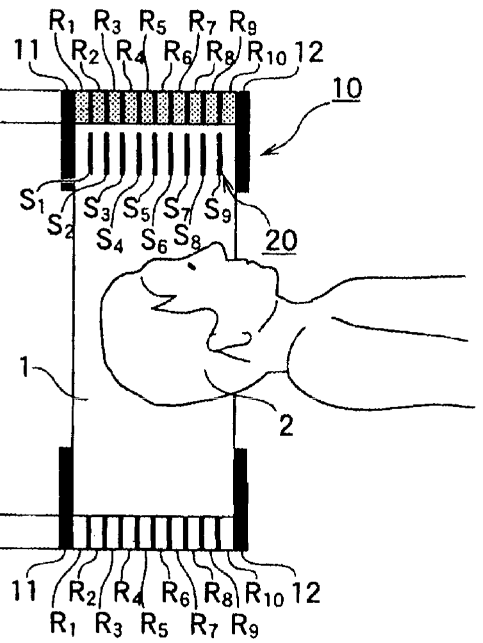

FIGS. 4A and 4B are views for explaining the configuration of detecting unit and slice septa of the PET apparatus in accordance with this embodiment. FIG. 4A is a view showing the detecting unit 10 as seen in a direction parallel to the center axis, whereas FIG. 4B shows a cross section obtained when the detecting unit 10 is cut along a plane including the center axis.

The detecting unit 10 of the PET apparatus in accordance with this embodiment has detector rings $R_1$ to $R_{10}$ stacked between shields 11 and 12. Each of the detector rings $R_1$ to $R_{10}$ has N photon detectors $D_1$ to $D_N$ arranged on a ring on a plane perpendicular to the center axis. Each of the photon detectors $D_1$ to $D_N$ is a scintillation detector in which a scintillator such as BGO ($Bi_4Ge_3O_{12}$), for example, and a photomultiplier tube are combined together; and detects a photon coming from a measurement space 1 including the center axis.

Disposed on the inside, i.e., on the measurement space 1 side, of the detecting unit 10 are slice septa 20. The slice septa 20 include nine shield plates $S_1$ to $S_9$ arranged at respective positions between neighboring detector rings. Each of the shield plates $S_1$ to $S_9$ is made of a material (e.g., tungsten or lead) absorbing a pair of photons generated at the position of an electron/positron pair annihilation and emitted in directions opposite to each other, where the γ-rays having an energy of 511 keV. The slice septa 20 exhibit a collimating action, so that only the photon pairs flying from directions having an angle of about 90 degrees with respect to the center axis are made incident on the photon detectors disposed therebehind.

Each of the shield plates $S_1$ to $S_9$ is not shaped like a ring, but is disposed on the measurement space 1 side of a part of the N photon detectors $D_1$ to $D_N$ (photon detectors $D_3$ to $D_1$ in FIGS. 4A and 4B) constituting each detector ring. Letting n (which is 8 in FIGS. 4A and 4B) be the number of photon detectors located behind the slice septa 20, the value of n/N is preferably ½or less, more preferably about ⅒to ⅙. The slice septa 20 are rotatable about the center axis, so as to carry out continuous rotation, stepwise rotation, or reciprocating rotation. The angular position in the rotation of the slice septa 20 is detected by an angular encoding detecting sensor or is grasped by a septa rotation driver for controlling the rotation thereof.

When at least one of a pair of photon detectors is located behind the slice septa 20 in the detecting unit 10, the pair of photon detectors detect only photon pairs coming from directions forming an angle of about 90 degrees with respect to the center axis. Also, the pair of photon detectors can efficiently eliminate scattered photons in which photon pairs generated at positions outside the measurement space are scattered. Namely, the coincidence-counting information obtained by the pair of photon detectors is equivalent to that obtained in a two-dimensional PET apparatus. In the following, this coincidence-counting information will be referred to as two-dimensional (2D) coincidence-counting information.

When none of a pair of photon detectors is located behind the slice septa 20, the pair of photon detectors can detect photon pairs coming from all the directions. Namely, the coincidence-counting information obtained by the pair of photon detectors is equivalent to that obtained in a three-dimensional (3D) PET apparatus. In the following, this coincidence-counting information will be referred to as three-dimensional coincidence-counting information.

The geometric detection efficiency of the two-dimensional coincidence-counting information is the highest within the ring plane (direct plane) of the same detector, and decreases due to the shielding effect of slice septa 20 as the difference between detector ring numbers (values n in the respective letters $R_n$ referring to detector rings), i.e., ring difference δ, is greater. Its effective axial angle of field $\phi_{2D}$ is represented by the following expression:

$$\phi_{2D} = \frac{d}{D} \sum_{-\delta\max}^{+\delta\max} \varepsilon(\delta) \tag{1}$$

where D is the inner diameter of the detector ring, d is the axial width of the photon detector, ε(δ) is the relative detection sensitivity of the projection tilted with respect to the direct plane, and $\delta_{max}$ is the maximum ring difference in the storage of two-dimensional coincidence-counting information.

Let $\phi_{3D}$ be the axial angle of field in the storage of three-dimensional coincidence-counting, and s (=n/N) be the ratio of the number n of photon detectors located behind the slice septa 20 to the number N of all the photon detectors. Then, the ratio R between the three-dimensional coincidence-counting information and the two-dimensional coincidence-counting information is represented by the following approximate expression:

$$R = \frac{(1-2s)}{2s} \frac{\phi_{3D}}{\phi_{2D}} \frac{d}{(d-w)} \tag{2}$$

where w is the width of slice septa 20 in the radial direction. For attaining this expression, effects of photon absorption and scattering are neglected. If $\phi_{2D}$=1°, $\phi_{3D}$=10°, S=⅛, d=6 mm, and w=1 mm, for example, then R=36.

Figure 5:
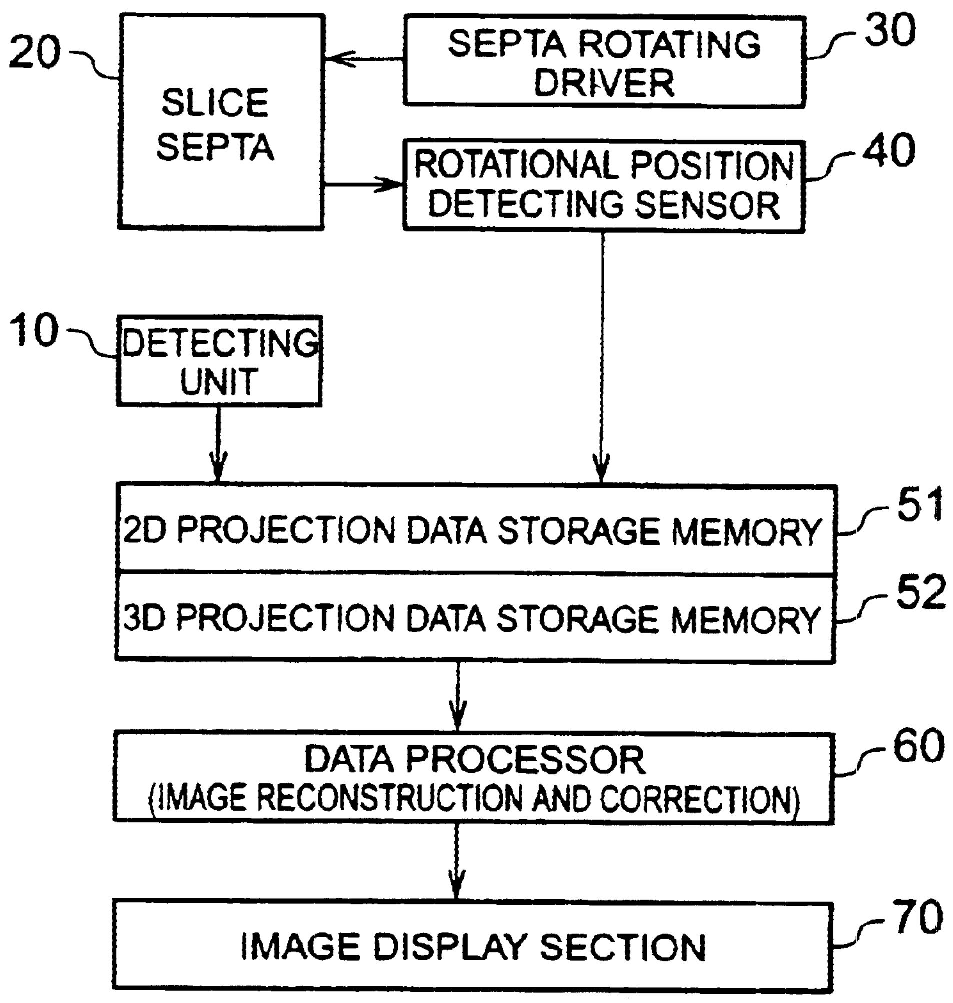
FIG. 5 is a block diagram for conceptually explaining the overall configuration of the PET apparatus in accordance with the embodiment.

FIG. 5 is a block diagram for conceptually explaining the overall configuration of the PET apparatus in accordance with this embodiment. A septa rotating driver 30 rotates the slice septa 20 about the center axis, whereas the rotational position sensor 40 detects the rotational position of the slice septa 20. During the period of one measurement operation carried out while a sample 2 is placed in the measurement space 1, the slice septa 20 are driven by the septa rotating driver 30 to rotate, whereas the rotational position of the slice septa 20 is always grasped by the angular position sensor 40. Then, when a pair of photon detectors detect a photon pair, it is determined whether at least one of the photon detectors is located behind the slice septa 20 or not. This determination is effected according to the rotational position of slice septa 20 detected by the rotational position detecting sensor 40.

If it is determined that one of the photon detectors is located behind the slice septa 20, then the coincidence-counting information detected by the pair of photon detectors is determined to be two-dimensional coincidence-counting information, and is stored into a memory area for the two-dimensional projection data 51. If not, by contrast, then the coincidence-counting information detected by the pair of photon detectors is determined to be three-dimensional coincidence-counting information, and is stored into a memory area for the three-dimensional projection data 52. Thus, the two-dimensional coincidence-counting information and the three-dimensional coincidence-counting information are stored separately, so as to make their corresponding histograms. In the following, the histogram of the two-dimensional coincidence-counting information will be referred to as two-dimensional projection data, whereas the histogram of the three-dimensional coincidence-counting information will be referred to as three-dimensional projection data.

According to the two-dimensional projection data and three-dimensional projection data, a data processor 60 reconstructs an image indicative of the spatial distribution of the frequency at which photon pairs occur within the sample 2. Also, the data processor 60 carries out detector sensitivity correction, attnuation correction, and scatter correction. An image display section 70 displays images reconstructed by the data processor 60.

Figure 6:
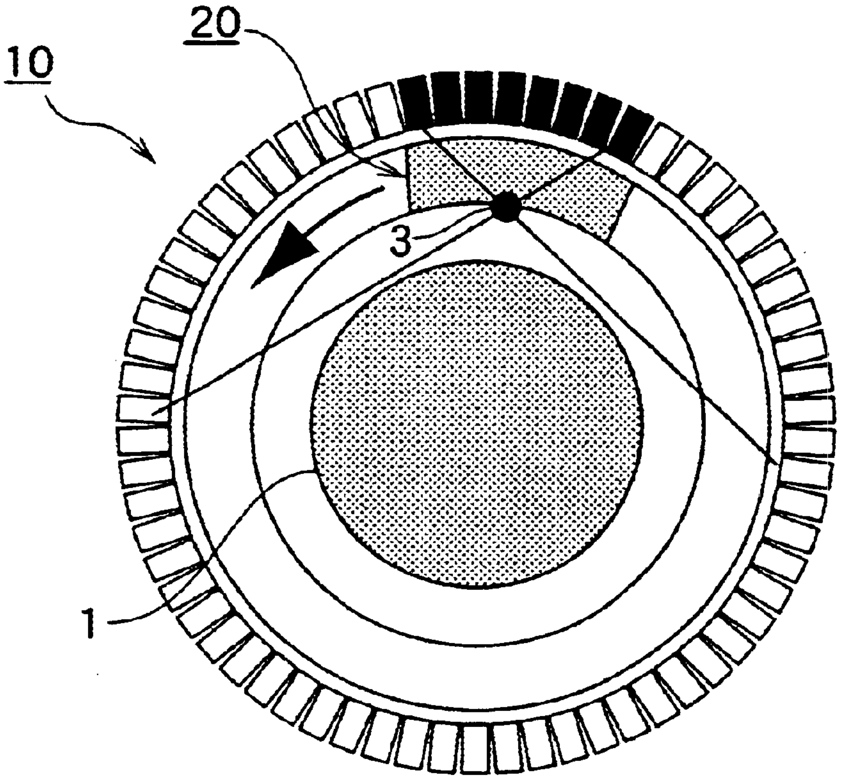
FIG. 6 is an explanatory view of blank measurement for detector sensitivity correction and transmission measurement for attenuation correction using a rotary calibration source.
Figure 7:
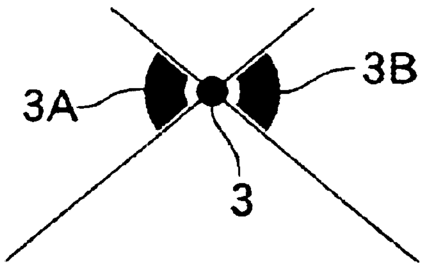
FIG. 7 is an explanatory view of the calibration source.

Blank measurement and transmission measurement will now be explained. FIG. 6 is an explanatory view of the blank measurement and transmission measurement using a calibration source. FIG. 7 is an explanatory view of the calibration source. These drawings are views observed in a direction parallel to the center axis as with FIG. 4A.

The calibration source 3 is formed like a rod made of $^{68}$Ge, for example, and is disposed parallel to the center axis, while in contact with the slice septa 20 near the center thereof on the measurement space 1 side. Also, two shields 3A and 3B are disposed so as to oppose each other across the calibration source 3. Due to the slice septa 20 and shields 3A and 3B, the detecting unit 10 does not detect the three-dimensional coincidence-counting information but only the two-dimensional coincidence-counting information. As a consequence, the contribution of scattered photons is reduced, whereby the counting rate of photon detectors near the calibration source 3 is prevented from extreme increase. Also, absorption correction methods developed for slice-septa-retractable type three-dimensional PET apparatus can be employed.

Without placing the sample 2 in the measurement space 1, the slice septa 20 are rotated together with the calibration source 3, so as to carry out blank measurement. The two-dimensional projection data thus stored into the two-dimensional projection data storage section 20 is blank data, and the detector sensitivity correction is carried out according to this blank data. On the other hand, with the sample 2 being placed in the measurement space 1, the slice septa 20 are rotated together with the calibration source 3, so as to carry out transmission measurement. The two-dimensional projection data thus stored into the two-dimensional projection data storage section 20 is transmission data, and the attenuation correction is carried out according to this transmission data. Also, while the sample 2 having an RI (radio isotope) source introduced therein are placed in the measurement space 1, the slice septa 20 may be rotated together with the calibration source 3, so as to carry out emission measurement and transmission measurement simultaneously.

Figure 8:
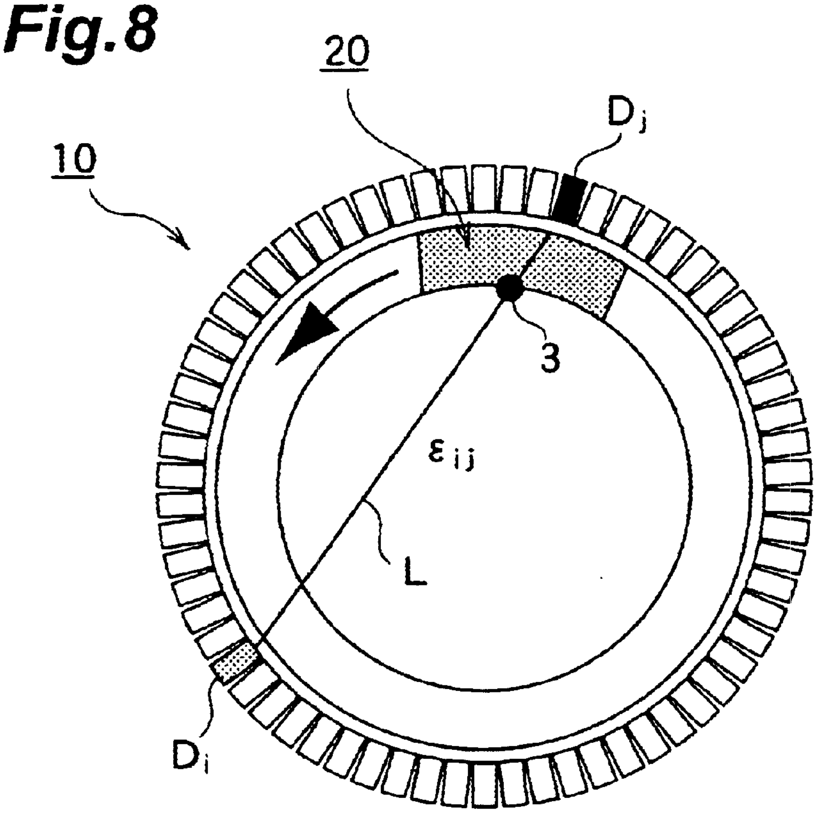
FIG. 8 is an explanatory view of detector sensitivity correction.
Figure 9:
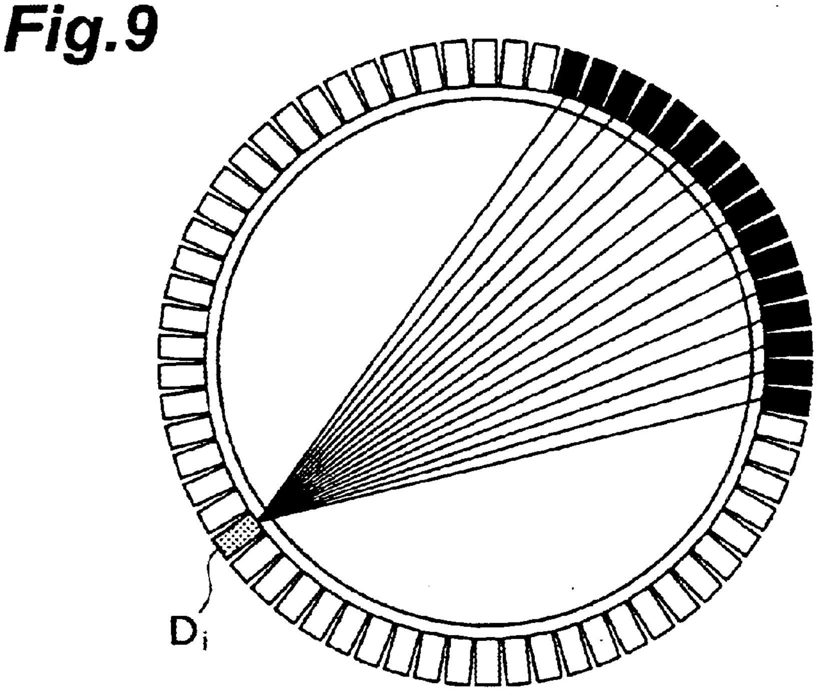
FIG. 9 is an explanatory view of detector sensitivity correction.

In the detector sensitivity correction, "indirect sensitivity calibration method" is preferably used. Each of FIGS. 8 and 9 is an explantory view of the detector sensitivity correction. The detection sensitivity with respect to a line in which a photon pair generated from the calibration source 3 flies, i.e., a coincidence-counting line L, is assumed as products of respective detection efficiencies of a pair of photon detectors $D_i$ and $D_j$ coincidence-counting the photon pair and various geographic factors $\epsilon_{ij}$ (see FIG. 8). Here, the geographic factors $\epsilon_{ij}$ are factors taking account of the detector ring difference δ, the distance from the center point of the measurement space to the coincidence-counting line L, and the like. Among these factors, the respective detection efficiencies of photon detectors are required to be periodically calibrated since they are temporally unstable and fluctuate.

Since a photon pair is detected by the photon detector $D_j$ collimated by the slice septa 20 and the photon detector $D_i$ not collimated thereby in the measurement using the rod-shaped calibration source 3, the PET apparatus in accordance with this embodiment can determine the detection efficiency at the time when each photon detector is collimated and that at the time when each photon detector is not collimated simultaneously from a single blank measurement operation by using "fun sum method" (see FIG. 9). Namely, according to the average value of coincidence-counting information items concerning a number of coincidence-counting lines passing the collimated photon detector $D_i$, the detection efficiency of the collimated photon detector $D_i$ is determined. Similarly, the detection efficiency of the collimated photon detector $D_j$ is determined. The two-dimensional projection data is calibrated according to the detection efficiency of the photon detector obtained at the time when it is collimated, whereas the three-dimensional projection data is calibrated according to the detection efficiency of the photon detector obtained at the time when it is not collimated.

The scatter correction and image reconstruction will now be explained. In general, the response of scattered beams (distribution of scatter coincidence events in projection data concerning a point-like source or rod-shaped source) greatly varies between in the two-dimensional projection data and in three-dimensional projection data. Namely, the scattered photons in the two-dimensional projection data are mainly caused by the scattering inside the detecting unit 10, i.e., within the measurement space 1 or near the space 1, whereby the response function of the scatter events (scatter response) with respect to the rod-shaped-source 3 placed parallel to the center axis is approximated well by an exponential function. By contrast, the scattered photons in the three-dimensional projection data are mainly caused by scattering in places far from the measurement space 1. The scatter response of scattered photons in the three-dimensional projection data includes very little fraction of high spatial frequency components, but mainly includes very low spatial frequency components, and is approximated well by a Gaussian function or parabolic function. Hence, as will be explained in the following, the PET apparatus in accordance with this embodiment utilizes the two-dimensional projection data, so as to accurately correct the contribution of scattered photons in the three-dimensional projection data (correct the scattering), thereby reconstructing an image.

The method explained in the following is one known as "difference method." In this method, it is assumed that the increase in scatter components with respect to a direct plane yielded when switching from the storage of two-dimensional coincidence-counting information to the storage of three-dimensional coincidence-counting information can be estimated from the difference between the three-dimensional projection data and two-dimensional projection data. Namely, the increase S' (r, θ) in scattering components is assumed to be given by the following expression:

$$S'(r,\theta)=p_{3D}(r,\theta)-\epsilon(r,\theta)\cdot p_{2D}(r,\theta) \tag{3}$$

where r is the position coordinate of projection, θ is the azimuth of projection, $p_{2D}(r, \theta)$ is the two-dimensional projection data, $p_{3D}(r, \theta)$ is the three-dimensional projection data, and $\epsilon(r, \theta)$ is an efficiency correction factor.

For correcting the influence of the scattering components included in the two-dimensional projection data, the scatter distribution S'(r, θ) in the above-mentioned expression (3) is multiplied by a correction factor k(θ), whereby the total scatter component S(r, θ) of three-dimensional projection data is represented by the following expression:

$$S(r,\theta)=k(\theta)\cdot S'(r,\theta) \quad (4)$$

where the correction factor k(θ) is determined by comparing the respective distributions of two-dimensional projection data and three-dimensional projection data with respect to each other in a region where the radiation sources do not exist.

The scatter distribution $p_{n,m}(r, \theta)$ in the tilted projection obtained between two detector rings $R_n$, $R_m$ whose respective detector ring numbers are n and m is obtained by linear interpolation from the scatter distribution of the direct plane whose detector ring number is int [(n+m)/2] and the scatter distribution of the direct plane whose detector ring number is int[(n+m)/2 ]+1. Here, int is the operator for returning the integer part. Here, the scatter distribution of the projection with a small angle of inclination is assumed to be substantially equal to the scattering distribution of the direct plane near the center position thereof.

Thus estimated scatter distribution is fully smoothed by a Gaussian filter having a half width of 25 mm, for example, and thus smoothed distribution is subtracted from the three-dimensional projection data. As a result, scatter-corrected three-dimensional projection data is obtained. The attenuation is corrected according to thus obtained three-dimensional projection data, and an image is reconstructed by an appropriate three-dimensional reconstruction algorithm.

The "difference method" explained in the foregoing is proposed for the slice-septa-retractable PET apparatus, and its validity is verified in actual apparatus. However, the "difference method" in the slice-septa-retractable PET apparatus has two major limitations as follows. The first limitation lies in that it is not applicable to the case where the distribution of the positron-emitting source in the body rapidly changes or the case of dynamic studies, since the two-dimensional projection data and three-dimensional projection data are stored upon different measurement operations respectively. The second limitation lies in that the accuracy of estimating the scatter distribution of the projection with a large angle of inclination is low. However, since the two-dimensional projection data and three-dimensional projection data are simultaneously stored upon a single measurement operation in the PET apparatus in accordance with this embodiment, the first limitation is not problematic. Also, the PET apparatus in accordance with this embodiment overcomes the second limitation by the following method (referred to as "addition method").

Figure 10:
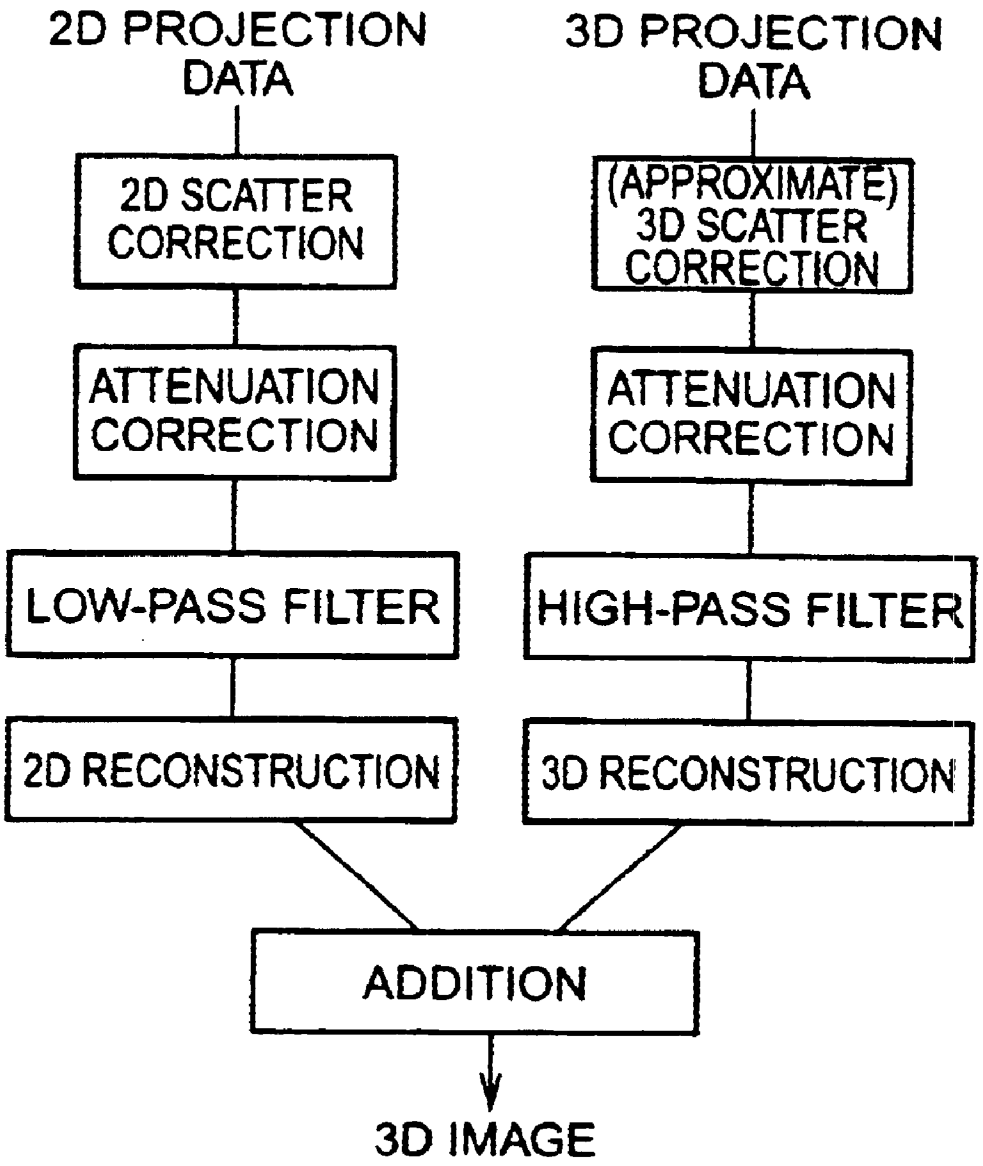
FIG. 10 is a flowchart for explaining a procedure of scatter correction and image reconstruction.

FIG. 10 is a flowchart for explaining the procedure of scatter correction and image reconstruction. The "addition method" explained in this flowchart reconstructs images of low spatial frequency components according to the two-dimensional projection data, reconstructs images of high spatial frequency components according to the three-dimensional projection data, and adds the two kinds of reconstructed images together, thereby yielding finally reconstructed images. This enables scatter correction in the projection data with large angles of inclination. Since the images of the low spatial frequency components are obtained according to the two-dimensional projection data, the contribution of scattering from the space outside the measurement space 1 is small.

For the three-dimensional projection data, the scatter correction is initially performed by the above-mentioned "difference method" or a simpler method (e.g., "Gaussian function fitting method" or the like). It is sufficient if the scatter correction is performed approximately. The "Gaussian function fitting method" is a method for estimating the scatter component in a subject by fitting the projection data with a Gaussian function in the area (where only the scattering is measured) outside the subject. Here, the scatter correction is necessary for appropriately carrying out the subsequent attenuation correction. Subsequently, scatter-corrected three-dimensional projection data is processed to normal attenuation correction, low-frequency components are conventional eliminated from the resulting data by processing with a high-pass filter h(r), and then high-frequency images are reconstructed by a three-dimensional reconstruction algorithm. The high-pass filter is designed so as to eliminate most of the scatter components included in the three-dimensional projection data.

On the other hand, the two-dimensional projection data is processed with scatter correction using "two-energy window method," "superposition integral deduction method," or the like, for example, the corrected data is then processed with attenuation correction, high-frequency components are eliminated from the resulting data by a low-pass filter g(r), and then low-frequency images are reconstructed by a two-dimensional reconstruction algorithm. The frequency response F[g(r)] of the low-pass filter g(r) is designed so as to be complementary to the frequency response F[h(r)] of the high-pass filter h(r). Namely, the relational expression of F[g(r)]+F[h(r)]=1 holds. Here, F[•] indicates a Fourier transform.

The finally reconstructed image is obtained by adding the high-frequency image obtained according to the three-dimensional projection data and the low-frequency image obtained according to the two-dimensional projection data together while multiplying them with appropriate factors in considering the respective detection sensitivities of the three-dimensional coincidence-counting information and two-dimensional coincidence-counting information.

Figure 11:
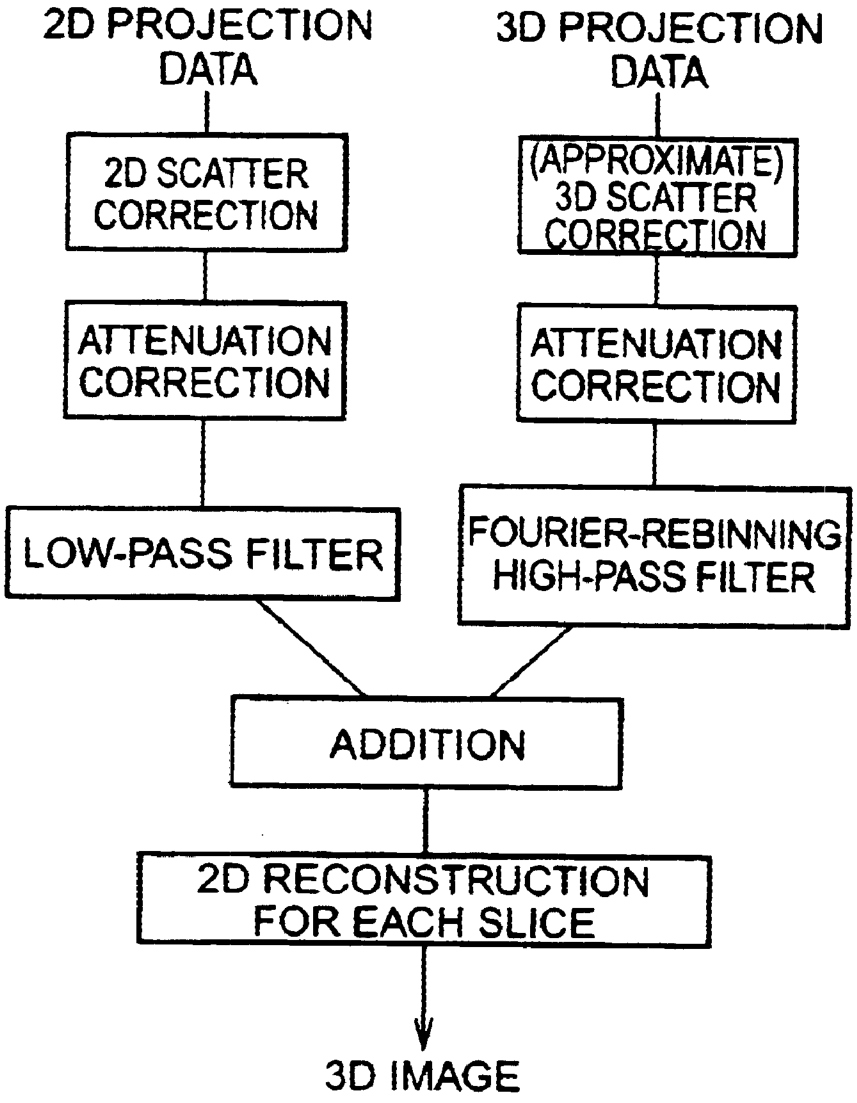
FIG. 11 is a flowchart for explaining the other procedure of scattering correction and image reconstruction.

FIG. 11 is a flowchart for explaining another procedure of scatter correction and image reconstruction. The method explained in this flowchart is one in which "Fourier rebinning: FRB) method" is applied to the three-dimensional projection data in the above-mentioned "addition method" and greatly improves the calculation efficiency.

For the three-dimensional projection data, the scatter correction is initially performed by the above-mentioned "difference method" or a simpler method (e.g., "Gaussian function fitting method" or the like). It will be sufficient if the scatter correction is done approximately. This scattering correction is necessary for appropriately carrying out attenuation correction subsequent thereto. Then, thus scatter-corrected three-dimensional projection data is processed with normal attenuation correction, and the processing is performed with "FRB method."

Figure 12:
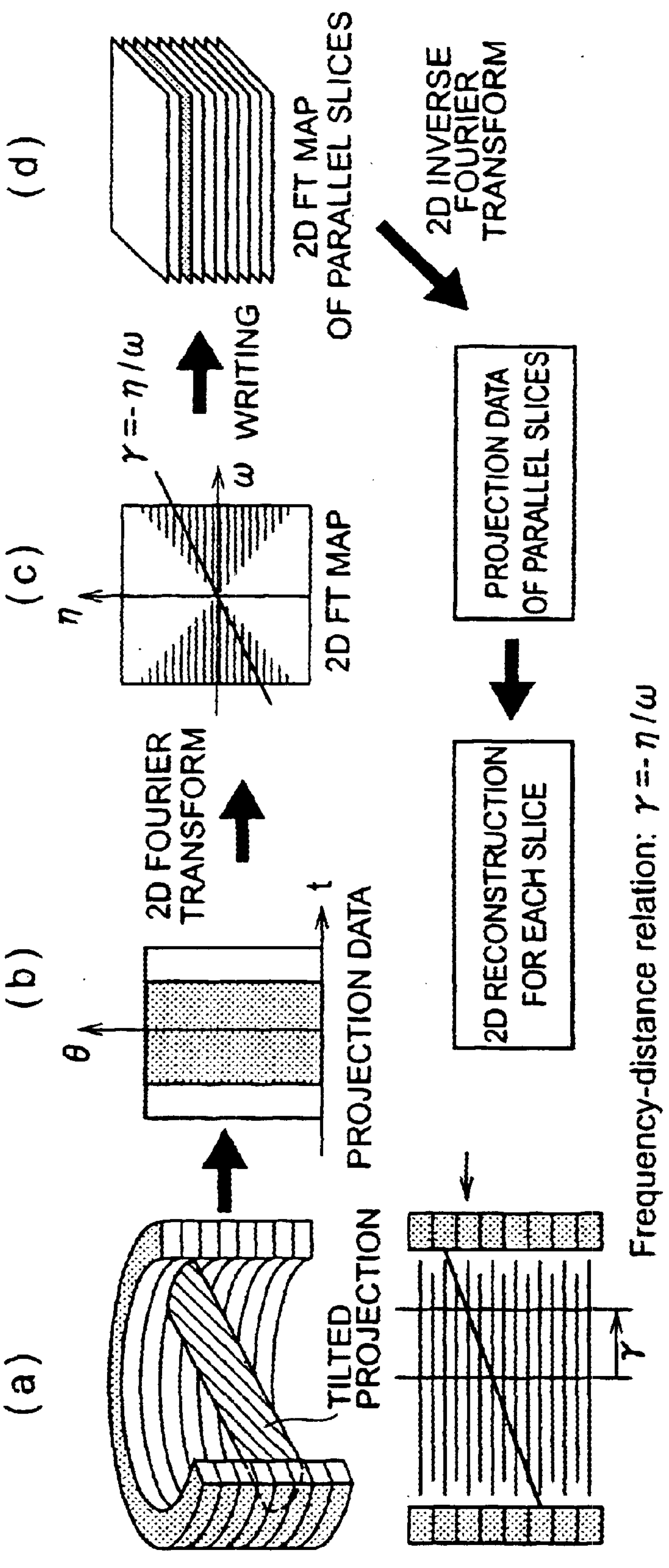
FIG. 12 is a view for explaining Fourier Rebinning (FRB) method.

FIG. 12 is a view for explaining the FRB method. In the FRB method, the three-dimensional projection data ((b) in FIG. 12) obtained concerning the projection tilted with respect to direct planes ((a) in FIG. 12) is transformed to two-dimensional Fourier transform concerning variables r and θ, whereby a two-dimensional Fourier transform map ((c) in FIG. 12) is obtained. This two-dimensional Fourier transform map is converted into a two-dimensional Fourier transform map of direct planes ((d) in FIG. 12) by using "frequency-distance relationship," i.e., "$r=-n/\omega$." Thus obtained two-dimensional Fourier transform map is transformed to two-dimensional inverse Fourier transform, whereby the projection data of direct planes ((e) in FIG. 12) is obtained. The projection data of individual direct planes is transformed to two-dimensional image reconstruction, whereby a reconstructed image ((f) in FIG. 12) is obtained.

In the flowchart shown in FIG. 11, the high-pass filter h(r) eliminates a low-frequency component from the projection data of direct planes ((e) in FIG. 12) formed by the FRB method according to the three-dimensional projection data subjected to the approximate scattering correction and absorption correction. The high-pass filter is designed so as to eliminate most of the scattering component included in the three-dimensional projection data.

On the other hand, the two-dimensional projection data is subjected to scattering correction by "two-energy window method," "superposition integral deduction method," or the like, for example, the corrected data is subjected to absorption correction, and then a high-frequency component are eliminated from the resulting data by the low-pass filter g(r). The frequency response F[g(r)] of the low-pass filter g(r) is designed so as to be complementary to the frequency response F[h(r)] of the high-pass filter h(r). Namely, the relational expression of F[g(r)]+F[h(r)]=1 holds.

Then, the low-frequency components of the three-dimensional projection data and the high-frequency components of the two-dimensional projection data are added together for each direct plane while being multiplied with appropriate factors in consideration of their respective detection sensitivities. The final images are reconstructed by applying the two-dimensional reconstruction algorithm to the added projection data.

Since no three-dimensional image reconstruction is carried out, the calculation time is short in this method. Though the FRB method has been known to yield errors in very low frequency components included in the three-dimensional projection data obtained concerning the projection tilted with respect to direct planes, the low-frequency components are eliminated in this embodiment, whereby this drawback does not become problematic.

The rms (root mean square) error of low-frequency image caused by statistical fluctuations in coincidence-counting information will now be explained. It is desirable that the magnitude of rms error of low-frequency image be sufficiently smaller than that of rms error of high-frequency image. In normal two-dimensional image reconstruction with "filtered backprojection method," letting a be the spatial resolution (full width at half maximum), and T be the total count, the relative rms noise of the resulting image is substantially proportional to $(a^3T)^{-1/2}$. Therefore, the $\text{ratio}_{rms}$ between the respective rms noises of the low- and high-frequency images is given by the following expression:

$$\text{ratio}_{rms}=R'^{1/2}\cdot(a_{3D}/a_{2D})^{3/2} \tag{5}$$

where $a_{3D}$ is the resolving power of the image obtained according to the three-dimensional projection data, $a_{2D}$ is the resolution of the image obtained according to the two-dimensional projection data, and R' is the ratio between the respective total counting values of the three-dimensional coincidence-counting information and two-dimensional coincidence-counting information. Since the scattering ratio varies between these cases, R' is somewhat greater than the ratio R (above-mentioned expression (2)) between the respective detection sensitivities of the three-dimensional coincidence-counting information and two-dimensional coincidence-counting information.

For example, in a brain PET apparatus having the transaxial field of view of 256 mm diameter, the narrowest half width of Gaussian function component in the scatter components included in the three-dimensional projection data is assumed to be about 100 mm or greater. Hence, if $a_{2D}$=50 mm, $a_{3D}$=3 mm, and R'=50, then $\text{ratio}_{rms}$ becomes 0.104. This numerical example is used for high-resolution measurement in which a sufficient count data is acquired. In the case where the amount of the count data is small, it is necessary to enhance $a_{3D}$, whereby $\text{ratio}_{rms}$ increases. For example, if $a_{3D}$=3 mm, then $\text{ratio}_{rms}$ becomes 0.632.

As in the foregoing, the PET apparatus in accordance with this embodiment can simultaneously obtain the two-dimensional projection data and three-dimensional projection data in a single measurement operation, thus being applicable to the case where the distribution of positron-emitting source changes quickly or the case of dynamic stdies. Also, the PET apparatus in accordance with this embodiment can detect photon pairs with high sensitivity so as to yield the three-dimensional projection data, and can effectively carry out scatter correction using the two-dimensional projection data. Namely, the PET apparatus in accordance with this embodiment reconstructs an image of low spatial frequency components according to the two-dimensional projection data, reconstructs an image of high spatial frequency components according to the three-dimensional projection data, and adds the two reconstructed images together, so as to yield a finally reconstructed image, thereby enabling the scatter correction in the projection data having a large angle of inclination.

In the PET apparatus in accordance with this embodiment, the ratio s (=n/N) of the number n of photon detectors located behind the slice septa 20 to the total number N of photon detectors is an important design parameter. As can be seen in expression (2), if the value of s is greater, then the detection sensitivity of three-dimensional coincidence-counting information decreases in proportion to (1–2 s), and the detection sensitivity of two-dimensional coincidence-counting information increases in proportion to 2s. Therefore, it is necessary for the value of s to be determined in consideration of the balance between the detection sensitivity of three-dimensional coincidence-counting information and the accuracy in scatter correction. The value of s is preferably ½ or less, more preferably about 1/10 to ⅙.

Without being restricted to the above-mentioned embodiment, the present invention can be modified in various manners. In particular, the configuration of detecting unit and slice septa can be modified variously as in the following.

Figure 13:
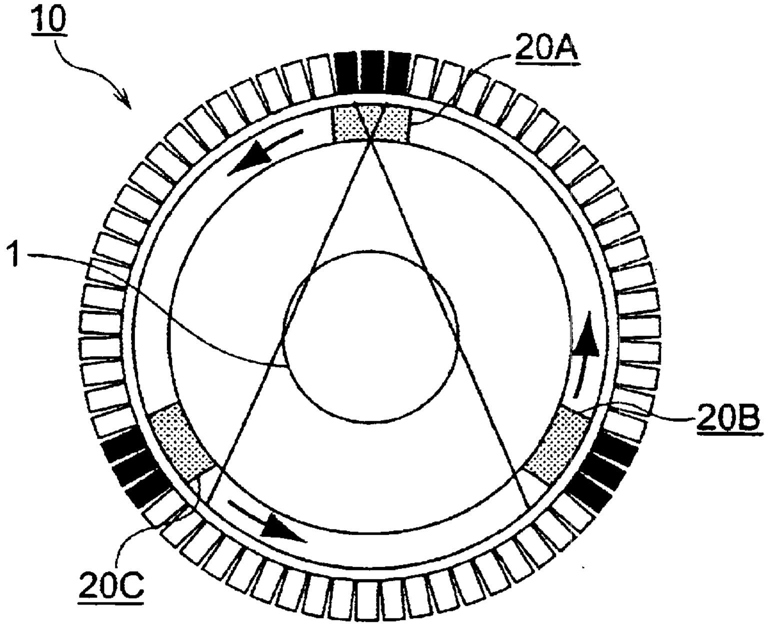
FIG. 13 is a view for explaining a first modified example of the configuration of detecting unit and slice septa.

FIG. 13 is a view for explaining the first modified example of the configuration of detecting unit and slice septa. This drawing shows the detecting unit as seen in a direction parallel to the center axis. In this modified example, slice septa 20A, 20B, and 20C are placed or arranged inside the detecting unit 10. The slice septa 20A, 20B, and 20C each have a configuration similar to that of the slice septa 20 in FIG. 4 and are arranged at substantially equal intervals on a circle about the center axis. This modified example is preferable in that the slice septa 20A, 20B, and 20C have an excellent rotational balance.

Figure 14A:
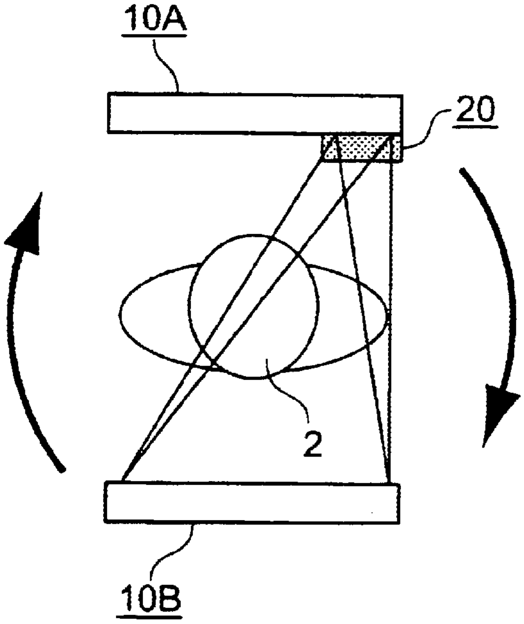
FIGS. 14A and 14B are views for explaining a second modified example of the configuration of detecting unit and slice septa.
Figure 14B:
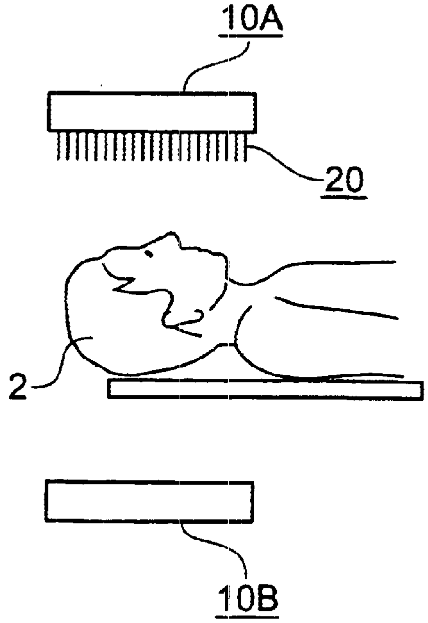

FIGS. 14A and 14B are views for explaining the second modified example of the configuration of detecting unit and slice septa. FIG. 14A is a view showing the detecting unit as seen in a direction parallel to the center axis, whereas FIG. 14B shows a cross section obtained when the detecting unit is cut along a plane including the center axis. In this modified example, each of detecting units 10A and 10B comprises photon detectors arranged two-dimensionally on a plane. The slice septa 20 comprise a plurality of shield plates perpendicular to the axis of rotation, and are fixed to a part of one detecting unit 10A on its inside. The detecting units 10A and 10B rotate about the sample 2, while keeping a relative positional relationship therebetween, thereby detecting the two-dimensional coincidence-counting information and three-dimensional coincidence-counting information.

Figure 15:
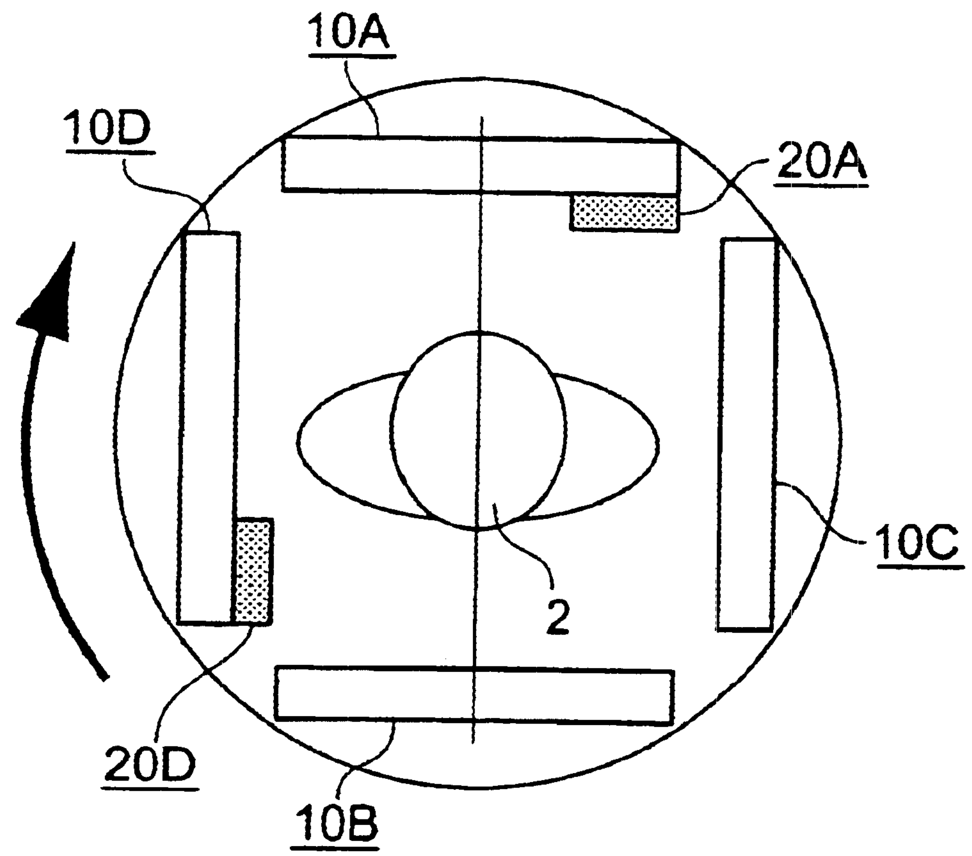
FIG. 15 is a view for explaining a third modified example of the configuration of detecting unit and slice septa.

FIG. 15 is a view for explaining the third modified example of the configuration of detecting unit and slice septa. This drawing shows the detecting unit as seen in a direction parallel to the center axis. In this modified example, each of detecting units 10A, 10B, 10C, and 10D comprises photon detectors arranged two-dimensionally on a plane. The slice septa 20A and 20D each comprise a plurality of shield plates perpendicular to the axis of rotation, and are respectively fixed to parts of the detecting units IOA and 10D on their inside. The detecting units 10A to 10D rotate about the sample 2, while keeping a relative positional relationship therebetween, thereby detecting the two-dimensional coincidence-counting information and three-dimensional coincidence-counting information.

As explained in detail in the fore going, since rotatable slice septa are placed in the measurement space side of a part of a plurality of photon detectors constituting each of a plurality of sets of detector rings, two-dimensional projection data and three-dimensional projection data can be obtained in a single measurement operation in accordance with the present invention. Hence, when the two-dimensional projection data and three-dimensional projection data are thus acquired at the same time so as to reconstruct an image, photon pairs can be detected with high sensitivity, and scatter correction and the like can be performed. Also, it is applicable to the case where the distribution of positron-emitting source changes quickly or the case of dynamic studies.

In particular, because the images are reconstructed with lower spatial frequency components in the two-dimensional projection data and higher spatial frequency components in the three-dimensional projection data respectively, photon pairs can favorably be detected with high sensitivity, so as to yield three-dimensional projection data, and the scattering can effectively be corrected in a favorable manner according to the two-dimensional projection data. Also, scatter correction in the projection data with a large angle of inclination is possible.

When a rod-shaped calibration source parallel to the center axis is provided on the measurement space side of the slice septa so as to store two-dimensional projection data and correct the reconstructed image according to the two-dimensional projection data, detector sensitivity correction and attenuation correction are carried out favorably, whereby favorable reconstructed images are obtained.

What is claimed is:

1. A PET apparatus comprising:

a detecting unit including a plurality of sets of detector rings, each detector ring comprising a plurality of photon detectors disposed on a plane perpendicular to a center axis, each photon detector detecting a photon flying from a measurement space including said center axis, said plurality of sets of detector rings being stacked in a direction parallel to said center axis;

slice septa disposed on said measurement space side of a part of said plurality of photon detectors constituting each of said plurality of detector rings, said slice septa arranged so as to correspond to only a part of the detector ring, said slice septa extending in a direction perpendicular to the center axis, said septa being rotatable around said center axis and on a plane perpendicular to the center axis, and said slice septa transmitting therethrough only a flying photon substantially perpendicular to said center axis;

slice septa position determining means for determining, when a pair of photon detectors in said photon detectors included in said detecting unit detect a photon pair, whether or not said slice septa exist on said measurement space side of at least one of said pair of photon detectors;

two-dimensional projection image storage means for storing, when it is determined by said slice septa position determining means that said slice septa exist on said measurement space side of at least one of said pair of photon detectors, coincidence-counting information of said photon pair obtained by said pair of photon detectors;

three-dimensional projection data storage means for storing, when it is determined by said slice septa position determining means that said slice septa do not exist on said measurement space side of any of said pair of photon detectors, coincidence counting information obtained by said pair of photon detectors; and image reconstructing means for reconstructing, according to three-dimensional projection data generated by said two-dimensional projection data storage means from coincidence-counting information stored thereby and three-dimensional projection data generated by said three-dimensional projection data storage means from coincidence-counting information stored thereby, an image indicative of a spatial distribution of a frequency at which photon pairs occur in said measurement space.

2. A PET apparatus according to claim 1, wherein said image reconstructing means reconstructs said image according to a component having a lower spatial frequency in said two-dimensional projection data and a component having a higher spatial frequency in said three-dimensional projection data.

3. A PET apparatus according to claim 1, further comprising correction means for correcting said image reconstructed by said image reconstructing means according to said two-dimensional projection data stored in said two-dimensional projection data storage means by providing a rod-shaped calibration source parallel to said center axis on said measurement space side of said slice septa.

4. A PET apparatus according to claim 1, wherein n/N is no larger than ½ wherein the number of the detectors corresponding to the slice septa is n, and the total number of the detectors is N.

5. A PET apparatus according to claim 4, wherein n/N is not less than 1/10 and not larger than 1/6.

* * * * *